April 11, 1933. A. H. SHOEMAKER 1,903,575
RADIAL CORD PNEUMATIC TIRE
Filed Feb. 24, 1932
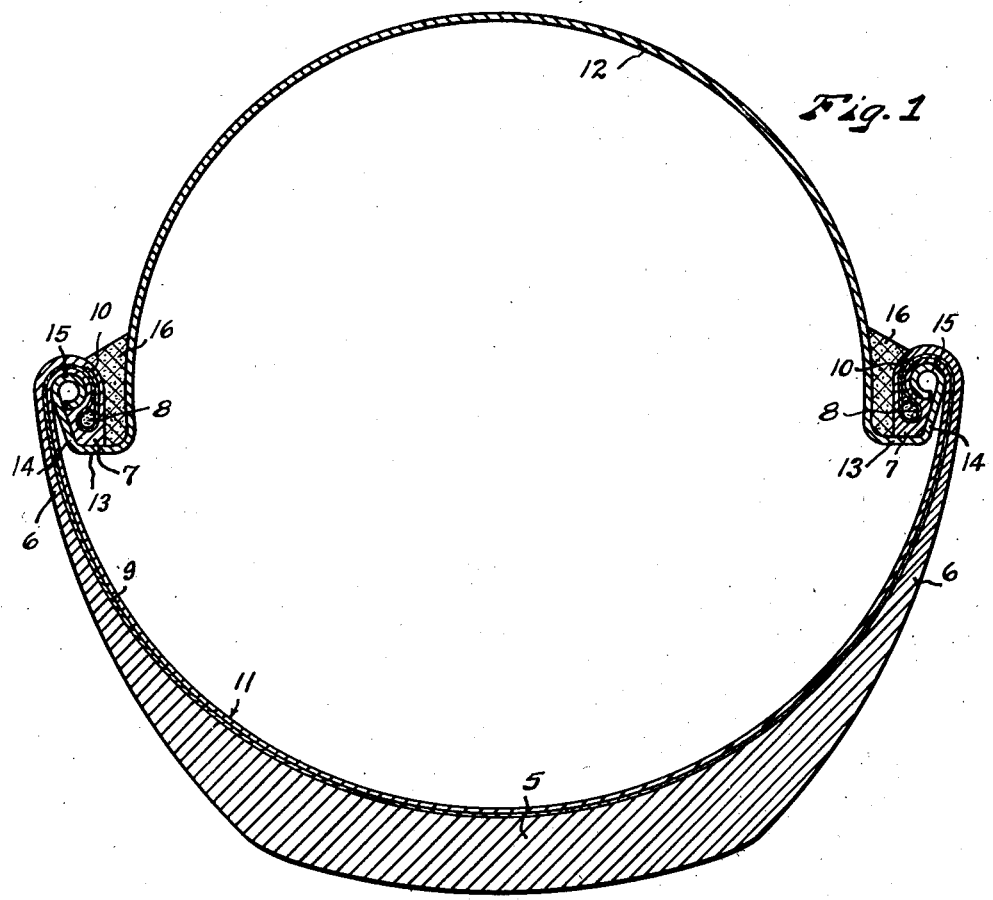
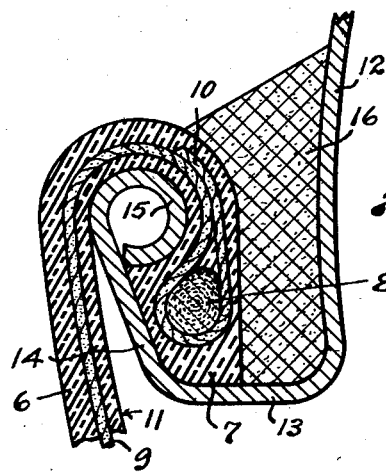
INVENTOR
Alvin H. Shoemaker
BY
Fred C. Matheny
ATTORNEY Patented Apr. 11, 1933

1,903,575

UNITED STATES PATENT OFFICE

ALVIN H. SHOEMAKER, OF SEATTLE, WASHINGTON

RADIAL CORD PNEUMATIC TIRE

Application filed February 24, 1932. Serial No. 594,844.

My invention relates to radial cord pneumatic tires, and the general objects of my invention are to provide a radial cord pneumatic tire characterized by extreme flexibility and pliability and one which runs very easily and freely on the road, is easy riding, is free from side sway and shimmy when in use and is very durable and possessed of excellent wearing qualities.

The term radial cord is herein used to designate reinforcing cords embedded in the tire in planes substantially radial to the tire and substantially at right angles to the medial plane of the tire.

Another object of my invention is to provide a radial cord tire which is very cheap to manufacture due chiefly to the fact that it requires very much less cotton cord than is required in the construction of an ordinary tire of the same size.

Another object is to provide a tire having radial cords which are relatively short in proportion to the size of the tire and having relatively elastic beads provided with embedded bead fillers which are longitudinally elastic but are relatively firm and hard and form a very firm and substantial means to which the radial cords may be anchored thus assuring a uniform anchorage for the ends of the cords and avoiding irregularities in the shape of the tire which I have found will occur in a radial cord tire if the cords are not securely and uniformly anchored at the locations of the tire beads.

Another object is to provide a radial cord tire for use with a relatively wide rim having bead receiving edges over which the bead portions of the tire may be drawn and securely held in widely spaced apart relation, the relative dimensions of the tire and rim being such that the length of the radial cords between the two points of contact of the tire with the edges of the rim will be substantially one and one half times the width of the rim. The relatively short radial cords leave the tire nonbound and free to stretch longitudinally thus obviating the necessity for a great deal of reinforcing which is placed in the usual tire to resist longitudinal strain. The spreading apart of the beads reduces the strain on the side walls of the tire incident to lateral thrust thus requiring a less amount of reinforcing to give the needed strength in the tire. This effects a very substantial saving in the cost of reinforcing cotton used in each tire.

Another object of the invention is to provide a radial cord tire which may be reduced in diameter after it has been cured and before it has been put into use thereby placing the rubber within said tire under compression and increasing the wearing and puncture resisting qualities of said tire.

A further object is to provide a tire which is capable of forming an air tight seal where it engages the rim thus making it possible to dispense with the usual inner tube.

In the manufacture of pneumatic tires if the usual nonelastic or substantially non-elastic bead rings are omitted or are replaced by longitudinally elastic bead members at the time the tire is molded the process of manufacture is greatly simplified and the cost of production of the tires is very much reduced and the tires are generally more flexible and more easily handled in shipment and marketing and it is further possible to reduce the diameter of such tires before they are placed in service thus placing the rubber of the tire under compression.

In the construction of pneumatic tires, if radial cord reinforcing alone is used in the tire and all longitudinal and diagonal reinforcing is omitted it is possible to produce a tire which has very thin and flexible side walls and is generally very flexible and elastic and one in which the load is substantially all supported by the compressed air in the tire and not by the stiffness of the reinforcing in the side walls of the tire. An extremely flexible and elastic tire of this nature will pass over small road obstructions very easily and without strain on the tire and is very free running on the road thus economizing on power, and has no interply friction and will not tend to heat when in use.

In my prior patents, Reissue No. 17,461 and Patent No. 1,756,666, I have disclosed radial cord tires having relatively thick and heavy walls and having non-elastic beads. The present radial cord tire is in contrast to these tires as it has very thin and flexible side walls and beads which are longitudinally elastic. I also find that when radial cord reinforcing is used in thin and flexible tires of this type and longitudinal and diagonal reinforcing is done away with the tires are so flexible and elastic that they are liable to be unstable and subject to side sway and shimmy and it becomes necessary to spread the bead portions of the tires widely apart. With tires of this type ample stability is attained when the bead portions of the tire are spread far enough apart so that the length of the radial reinforcing cords in the tire between the two points where the tire engages the rim is equal to substantially one and one half times the width of the rim. I also find that when purely radial cord reinforcing of this nature is used it is necessary to anchor the ends of the cords very firmly in the bead portion of the tire and to have each and every one of the cords of the correct length. The relatively firm longitudinally elastic bead filler which I use makes possible a firm and efficient anchoring of the ends of the cords in a tire bead which is sufficiently elastic for all of the purposes required in this tire.

Further objects of the invention will be apparent as the description proceeds.

In the drawing Fig. 1 is a cross section of a tire constructed in accordance with my invention, showing the same on a rim.

Fig. 2 is an enlarged sectional view of a fragment of this tire bead and the rim to which it is secured.

Referring to the drawing I show a tire comprising a tread portion 5 side walls 6 and bead portions 7 which are molded to the shape shown. The bead portions 7 have longitudinally elastic bead fillers 8, of relatively firm and substantial cross section embedded therein, said bead fillers preferably being formed of rolls of longitudinally elastic cotton fabric which are placed in the bead portions at the time the tire is built up. For these bead fillers 8 I prefer to use a rubberized cotton fabric commonly called Bike Fabric and to cut this fabric on a bias to form strips, then to splice the strips to form an endless band which is rolled to form a longitudinally elastic ring of relatively firm cross section. The reinforcing is in the nature of radial cords 9 which extend straight around the tire from one bead member to the other and are looped around each bead filler 8 and doubled back for a short distance as at 10. In constructing this tire I prefer to use for reinforcing two strips of ordinary commercial rubber cord fabric with the cords running crosswise and to place these strips one upon the other and stretch them to substantially twice the length that they are before being used in the tire and to double the edges of the strips over the bead fillers 8 so that the bead fillers 8 are in the bights of the cords as shown in the drawing and every cord is firmly held. I find that if the cords are not thus firmly and securely held the sides of the tire may be uneven and bumpy when subjected to internal air pressure. The reinforcing cords are each encased in rubber so that there is no friction between adjacent cords and said cords form a relatively thin layer which lies close to the inner wall of the tire and care is taken that none of these cords are exposed and that a layer of rubber 11, which is impervious to air, lines the entire inside of the tire and makes the tire air tight.

A deep channeled rim 12 is preferably provided in connection with this tire, said rim having bead receiving portions which are bent outwardly as at 13 and thence bent reversely as at 14 and which terminate in inwardly protruding rolls 15 around which the side walls of the tire immediately adjacent the tire beads 7 may be drawn, the tire bead portions 7 being positioned in the annular rim grooves afforded by the relatively bent portions 14 and extending partially underneath the rolls 15. Any suitable means may be provided for locking the tire bead portions securely within the rim grooves. In the present disclosure I show a non-metallic locking ring 16 which I have found to be a simple and efficient means for accomplishing this purpose.

This tire is molded to a larger diameter than it is to be when in service and the diameter of said tire is reduced when it is placed on the rim, thus placing the rubber, especially in the tread portion of the tire under compression when in service, whereby said rubber will have greater wearing qualities and will tend to close up any cuts or punctures which may be made therein. The rim serves as a non-elastic means for firmly and securely holding the tire to a reduced diameter after it has been placed on such rim. The radial cord reinforcing and the absence of longitudinal and diagonal reinforcing make this tire especially well adapted to be reduced in diameter and placed under compression in this manner, it being obvious that longitudinal contraction of this tire will only compress the rubber while longitudinal contraction of a tire which is longitudinally or diagonally reinforced will slacken the reinforcing upon which the longitudinally or diagonally bound tire is dependent for its strength. To permit the diameter of my radial cord tire to be thus reduced when the tire is applied to the rim it is obviously necessary that the tire beads and bead fillers must be longitudinally elastic.

The foregoing description and accompanying drawing clearly disclose what I now regard as a preferred embodiment of my invention, but it will be apparent that this disclosure is merely illustrative and that such changes in the invention may be made as are fairly within the scope and spirit of the following claims.

I claim:

1. In a radial cord tire structure adapted for mounting on a rim having reversely bent side edges defining tire bead receiving channels, a tire member having its transverse curvature on an arc of approximately 180° and having bead portions, relatively firm longitudinally elastic bead fillers embedded in said bead portions, and reinforcing cords embedded in said tire in radial planes and anchored to said bead fillers, said bead portions adapted to be extended over the reversely bent portions of the rim for reception in the channel to occupy positions opposite adjacent portions of the side walls of the tire with the reversely bent portions of the rim therebetween.

2. In a radial cord tire structure adapted for mounting on a rim having reversely bent side edges defining tire bead receiving channels, a tire member having its transverse curvature on an arc of approximately 180° and having thin and flexible side walls terminating in bead portions, a longitudinally elastic bead filler of firm and substantial cross-section embedded in each of said bead portions, a relatively thin layer of reinforcing cords embedded in said tire and positioned close to the inner surface of said tire, said cords being in radial planes and the ends of said cords extending around and being anchored to said bead fillers, said tire being elastic in longitudinal directions with the bead portions adapted to be extended over the reversely bent portions of the rim for reception in the channels to occupy positions opposite adjacent portions of the side walls of the tire with the reversely bent portions of the rim therebetween.

3. In a radial cord tire and a rim therefor, a tire member having its transverse curvature on an arc of approximately 180° and having thin and flexible side walls which terminate in bead portions, a longitudinally elastic bead filler of firm and substantial cross-section embedded in said bead portions, radially positioned reinforcing cords embedded in said tire relatively close to the inner surface thereof and extending around said bead filler and anchored to said bead filler, a rim positioned between said bead portions and having rolled flange edges defining bead receiving channels with the walls of the tire adjacent the bead folded over the flange edges whereby the beads are supported in the channels in spaced apart relation and means for securing said tire bead portions in the rim channels.

4. In a radial cord tire and a rim therefor, a tire member having its transverse curvature on an arc of approximately 180° and having thin and flexible side walls which terminate in bead portions, a longitudinally elastic bead filler of firm and substantial cross-section embedded in each of said bead portions, a relatively thin layer of reinforcing cords embedded in said tire and positioned close to the inner surface of said tire, said cords being in radial planes and the ends of said cords being securely anchored to said bead filler, a deep channelled airtight rim positioned between said tire bead portions and having rolled edges which are laterally curved outwardly and radially curved inwardly and around which the flexible parts of said tire immediately adjacent said bead portions extend whereby said flexible side wall parts engage the rolled rim portions radially inward from the periphery of the rim and are free to flex to the location of their contact with said roller rim portion, said rolled edges of said rim supporting said tire bead portions in widely spaced apart relation, said tire having an airtight lining and forming an airtight connection with said rim and means securing said tire bead portions in airtight relationship to said rim.

5. In a transverse cord tire and rim combination, a radial cord tire having a transverse curvature of approximately 180° and an airtight rim having rolled edges defining tire bead receiving channels, the bead portions of said tire extending over the outer sides of the rolled edges of said rim and occupying positions in the channels inwardly of the rolled edges and means securing said tire bead portions in airtight relationship to the rolled edges of said rim.

The foregoing specification signed this 19th day of Feb. 1932.

ALVIN H. SHOEMAKER.